US012573976B2

(12) United States Patent
Naruse et al.

(10) Patent No.: US 12,573,976 B2
(45) Date of Patent: Mar. 10, 2026

(54) ELECTRIC MOTOR DEVICE

(71) Applicant: KABUSHIKI KAISHA TOYOTA JIDOSHOKKI, Kariya (JP)

(72) Inventors: Takuya Naruse, Kariya (JP); Shunsuke Ambo, Kariya (JP); Takashi Ogami, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 283 days.

(21) Appl. No.: 18/365,459

(22) Filed: Aug. 4, 2023

(65) Prior Publication Data

US 2024/0056016 A1    Feb. 15, 2024

(30) Foreign Application Priority Data

Aug. 10, 2022    (JP) ................................. 2022-127831

(51) Int. Cl.
| | |
|---|---|
| *H02P 27/08* | (2006.01) |
| *H02K 11/02* | (2016.01) |
| *H02K 11/30* | (2016.01) |

(52) U.S. Cl.
CPC .............. *H02P 27/08* (2013.01); *H02K 11/02* (2013.01); *H02K 11/30* (2016.01)

(58) Field of Classification Search
CPC ........ H02K 11/00; H02K 11/02; H02K 11/30; H02K 11/33; H02P 29/00; H02P 29/40; H02P 29/50; H02P 6/00; H02P 6/10; H02P 7/00; H02P 7/48; H02P 7/63; H02P 21/00; H02P 21/05; H02P 21/16; H02P 21/18; H02P 21/22; H02P 27/00; H02P 27/08; H02P 27/085; H02M 1/00; H02M 1/08; H02M 1/12; H02M 1/14; H02M 3/00; H02M 3/15; H02M 3/155; H02M 7/00; H02M 7/48; H02M 7/53; H02M 7/538; H02M 7/5387; H02M 7/539; H02M 7/5395; H03H 7/00; H03H 7/09; B60L 15/00;

(Continued)

(56) References Cited

U.S. PATENT DOCUMENTS

2004/0207463 A1* 10/2004 Pelly ..................... H02M 5/458
                                                          327/552
2010/0250067 A1    9/2010 Matsumura et al.
(Continued)

FOREIGN PATENT DOCUMENTS

DE    10 2016 112 192 A1    1/2017
DE    10 2017 123 218 A1    4/2018
(Continued)

*Primary Examiner* — Tran N Nguyen
(74) *Attorney, Agent, or Firm* — Sughrue Mion, PLLC

(57) ABSTRACT

An electric motor device includes an electric motor, an inverter, a noise reducer, a control unit, and a metal housing. The controller controls switching elements using a PWM signal generated from a voltage instruction value and a carrier frequency. The control unit includes a calculation portion that calculates a modulation factor of the voltage instruction value and a setting portion that sets the carrier frequency in accordance with the modulation factor. The carrier frequency set by the setting portion is higher when the modulation factor is less than a predetermined modulation factor than when the modulation factor is greater than or equal to the predetermined modulation factor.

1 Claim, 7 Drawing Sheets

(58) Field of Classification Search
CPC .......... B60L 15/08; B60L 50/00; B60L 50/51;
B62D 5/00; B62D 5/04; B62D 5/046;
B62D 5/0463
See application file for complete search history.

(56) References Cited

U.S. PATENT DOCUMENTS

| | | | |
|---|---|---|---|
| 2012/0134188 A1* | 5/2012 | Lai .......................... | H02P 27/08 |
| | | | 323/299 |
| 2017/0012506 A1 | 1/2017 | Naito et al. | |
| 2018/0102723 A1 | 4/2018 | Kawashima et al. | |
| 2019/0341869 A1* | 11/2019 | Sumasu .................. | H02P 27/08 |
| 2021/0152110 A1* | 5/2021 | Dallas .................... | A01G 3/085 |
| 2022/0247328 A1 | 8/2022 | Ajima et al. | |
| 2024/0042867 A1 | 2/2024 | Hara et al. | |

FOREIGN PATENT DOCUMENTS

| | | |
|---|---|---|
| DE | 11 2020 003 588 T5 | 4/2022 |
| DE | 11 2021 005 439 T5 | 8/2023 |
| JP | 2005-130575 A | 5/2005 |
| JP | 2010-221856 A | 10/2010 |
| JP | 2017-22961 A | 1/2017 |
| JP | 2019-103325 A | 6/2019 |
| JP | 2020-010507 A | 1/2020 |
| WO | 2010/004971 A1 | 1/2010 |

* cited by examiner

ELECTRIC MOTOR DEVICE

BACKGROUND

1. Field

The following description relates to an electric motor device.

2. Description of Related Art

Japanese Laid-Open Patent Publication No. 2017-022961 discloses an air conditioner including an electric motor, an inverter, a noise reducer, a controller, and a metal housing. The electric motor includes coils for three phases. The inverter includes switching elements. The inverter drives the electric motor. The noise reducer is arranged at the input side of the inverter. The noise reducer reduces common mode noise. The controller controls the switching elements using a pulse width modulation (PWM) signal generated from a voltage instruction value and a carrier frequency. The housing accommodates the electric motor, the inverter, the noise reducer, and the controller. The housing is connected to ground through the body of the vehicle.

Common mode noise includes common mode current resulting from the neutral-point voltage of the electric motor. It is desired that common mode current be reduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electric motor device includes: an electric motor including coils for three-phases; an inverter including a switching element and configured to drive the electric motor; a noise reducer located at an input side of the inverter and configured to reduce common mode noise; processing circuitry configured to control the switching element using a pulse width modulation (PWM) signal generated from a voltage instruction value and a carrier frequency; and a metal housing accommodating the electric motor, the inverter, the noise reducer, and the processing circuitry and configured to be connected to ground through a body of a vehicle. The processing circuitry is configured to: calculate a modulation factor of the voltage instruction value; and set the carrier frequency in accordance with the calculated modulation factor. The carrier frequency set by the processing circuitry is higher when the modulation factor is less than a predetermined modulation factor than when the modulation factor is greater than or equal to the predetermined modulation factor.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An electric motor device according to one embodiment will now be described with reference to the drawings. The electric motor device of the present embodiment is installed in a vehicle. The electric motor device of the present embodiment is used in a motor-driven compressor of an air conditioner.

Figure 1:
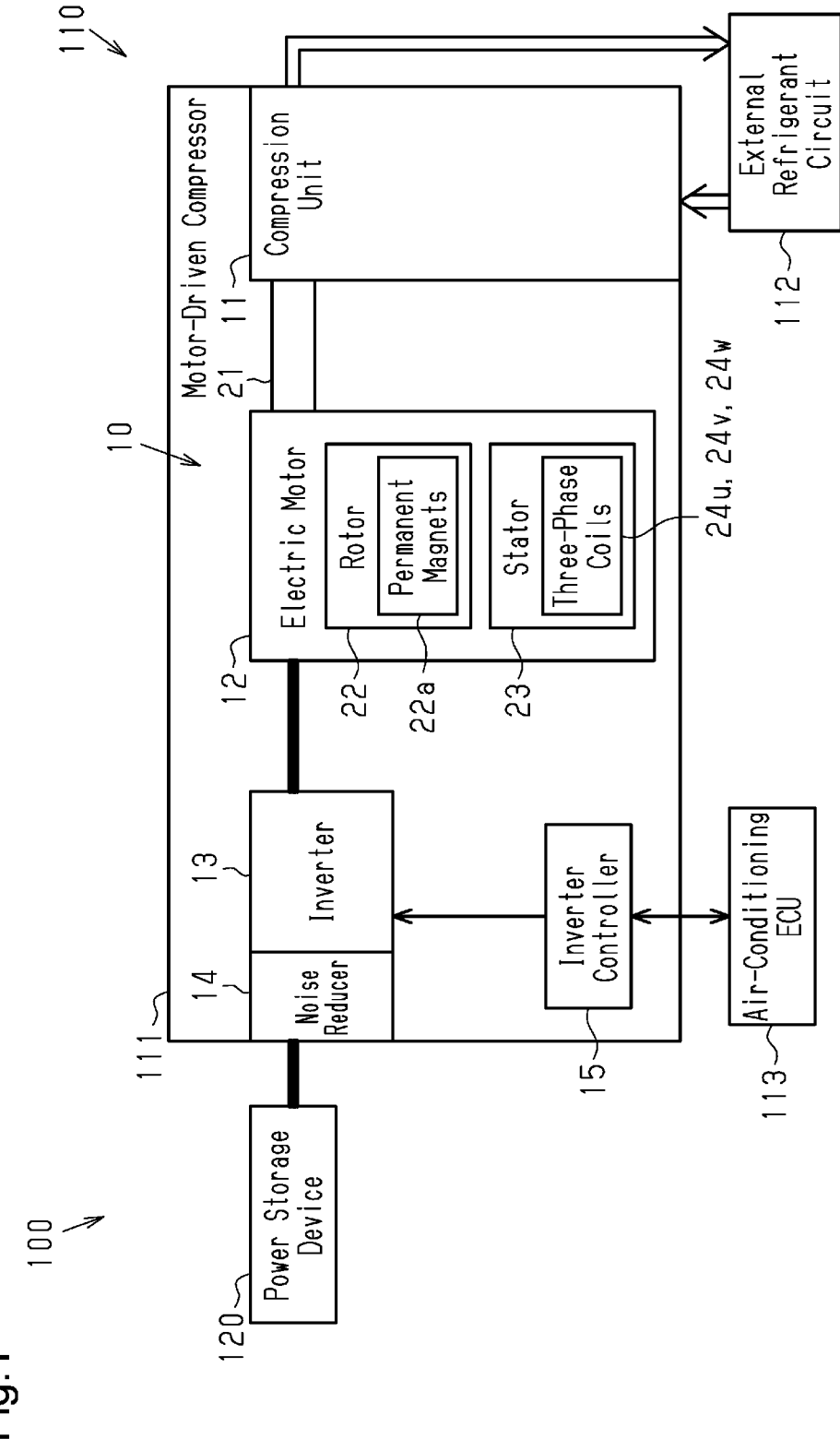
FIG. 1 is a block diagram showing the configuration of a vehicle according to an embodiment.

As shown in FIG. 1, a vehicle 100 includes an air conditioner 110 and a power storage device 120.

The air conditioner 110 includes a motor-driven compressor 111, an external refrigerant circuit 112, and an air-conditioning ECU 113. The motor-driven compressor 111 compresses refrigerant. The external refrigerant circuit 112 includes, for example, a heat exchanger, an expansion valve, and the like. The motor-driven compressor 111 compresses the refrigerant, and the external refrigerant circuit 112 exchanges heat with the refrigerant and expands the refrigerant to cool or warm the passenger compartment. The air-conditioning ECU 113 controls the entire air conditioner 110. The air-conditioning ECU 113 is configured to obtain parameters, such as the temperature of the passenger compartment, and a target temperature of the in-vehicle air conditioner. The air-conditioning ECU 113 transmits various instructions such as an instructed rotational speed Nc to the motor-driven compressor 111 from the obtained parameters.

Direct-current power is charged to and discharged from the power storage device 120. The power storage device 120 is, for example, a rechargeable battery, an electric double-layer capacitor, or the like. The power storage device 120 is mounted on the body of the vehicle 100. The power storage device 120 is used as a direct-current power supply of the motor-driven compressor 111. The negative electrode of the power storage device 120 is connected to ground through the body of the vehicle 100.

The motor-driven compressor 111 includes an electric motor device 10 and a compression unit 11. The electric motor device 10 includes an electric motor 12, an inverter 13, a noise reducer 14, and an inverter controller 15. The electric motor 12 drives the compression unit 11. The inverter 13 drives the electric motor 12. The noise reducer 14 reduces common mode noise. The inverter controller 15 controls the inverter 13.

Figure 2:
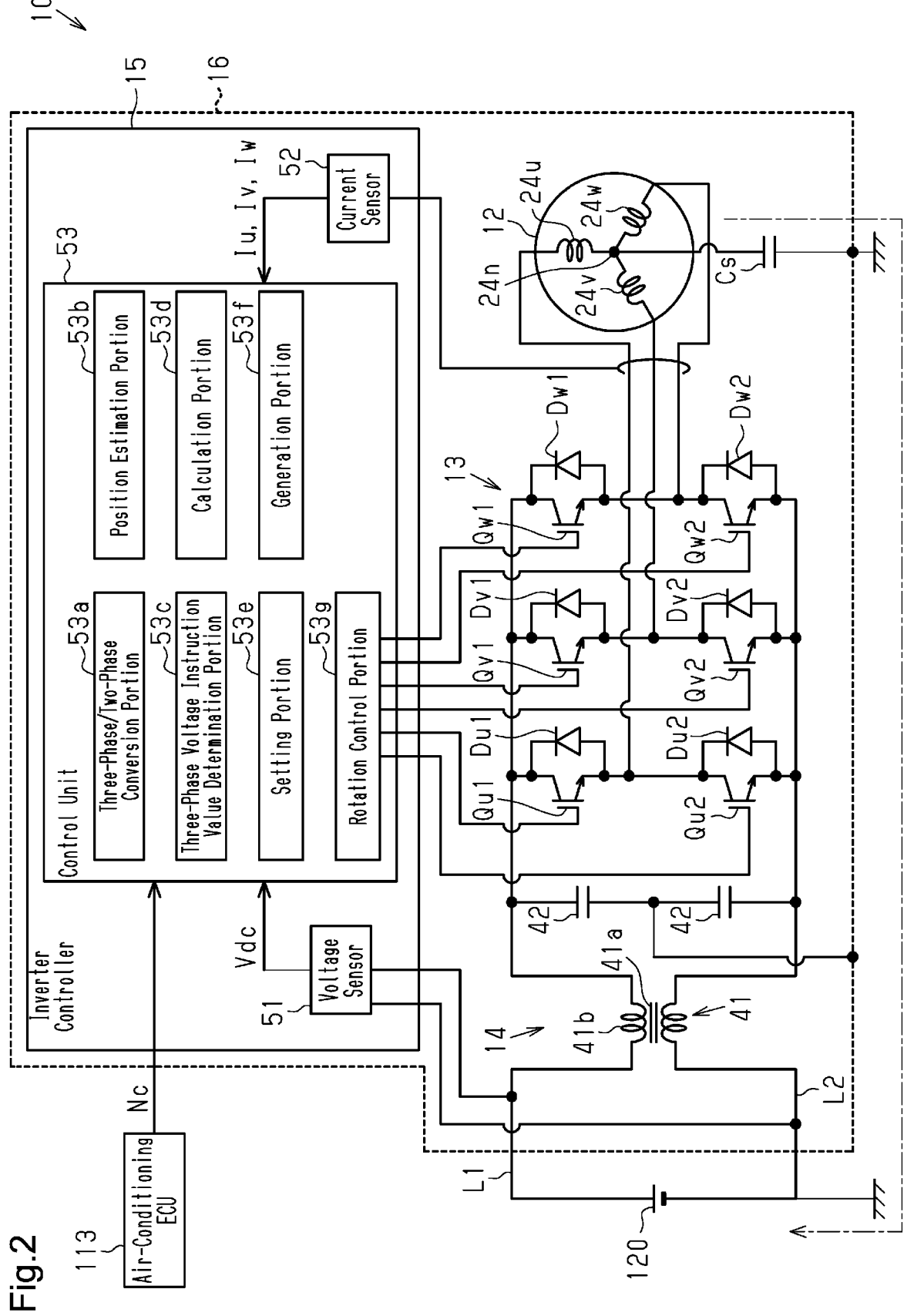
FIG. 2 is a block diagram showing the configurations of an inverter, a noise reducer, and an inverter controller according to the embodiment.

As shown in FIG. 2, the electric motor device 10 includes a housing 16. The housing 16 accommodates the electric motor 12, the inverter 13, the noise reducer 14, and the inverter controller 15. The housing 16 is made of metal and conductive. The housing 16 is connected to ground through the body of the vehicle 100.

Electric Motor

As shown in FIG. 1, the electric motor 12 includes a rotary shaft 21, a rotor 22, and a stator 23. The electric motor 12 is a three-phase motor. The rotor 22 is fixed to the rotary shaft 21. The rotor 22 includes permanent magnets 22a. The stator 23 is arranged facing the rotor 22. The stator 23 includes a stator core (not shown) and coils 24u, 24v, 24w for three phases. The coils 24u, 24v, 24w are a u-phase coil 24u, a v-phase coil 24v, and a w-phase coil 24w. The three-phase coils 24u, 24v, 24w are wound around the stator core. The rotor 22 is rotated by energizing the three-phase coils 24u, 24v, 24w in a predetermined pattern. The rotary shaft 21 is rotated integrally with the rotor 22.

As shown in FIG. 2, the three-phase coils 24u, 24v, 24w are connected to form a Y-configuration. The three-phase coils 24u, 24v, 24w have first ends electrically connected to each other to form a neutral point 24n. The three-phase coils 24u, 24v, 24w have second ends opposite to the first ends and connected to the invertor 13.

Compression Unit

The compression unit 11 compresses refrigerant when the electric motor 12 is driven. Specifically, when the rotary shaft 21 is rotated, the compression unit 11 compresses the refrigerant supplied from the external refrigerant circuit 112. The refrigerant compressed by the compression unit 11 is discharged to the external refrigerant circuit 112. The compression unit 11 may be of any type such as a scroll type, a piston type, or a vane type.

Inverter

The inverter 13 converts direct-current power, output from the power storage device 120, into alternating-current power. The electric motor 12 is driven by the alternating-current power output from the inverter 13.

As shown in FIG. 2, the inverter 13 includes switching elements Qu1, Qu2, Qv1, Qv2, Qw1, Qw2. Hereafter, the switching elements Qu1, Qu2, Qv1, Qv2, Qw1, Qw2 are referred to as the switching elements Qu1 to Qw2.

The switching elements Qu1 to Qw2 of the present embodiment are, for example, power switching elements such as insulated gate bipolar transistors (IGBTs). The switching elements Qu1 to Qw2 respectively include freewheeling diodes Du1 to Dw2. Specifically, the u-phase switching device Qu1 includes the freewheeling diode Du1. The u-phase switching device Qu2 includes the freewheeling diode Du2. The v-phase switching device Qv1 includes the freewheeling diode Dv1. The v-phase switching device Qv2 includes the freewheeling diode Dv2. The w-phase switching device Qw1 includes the freewheeling diode Dw1. The w-phase switching device Qw2 includes the freewheeling diode Dw2. Hereinafter, the freewheeling diodes Du1, Du2, Dv1, Dv2, Dw1, Dw2 are referred to as the freewheeling diodes Du1 to Dw2. The cathodes of the freewheeling diodes Du1 to Dw2 are connected to the collectors of the corresponding switching elements Qu1 to Qw2. The anodes of the freewheeling diodes Du1 to Dw2 are connected to the emitters of the corresponding switching elements Qu1 to Qw2.

The u-phase switching elements Qu1 and Qu2 are connected in series to each other by a u-phase connection line. The u-phase connection line is branched and connected to the second end of the u-phase coil 24u. The collector of the u-phase switching device Qu1 is connected to a positive bus L1. The emitter of the u-phase switching element Qu2 is connected to a negative bus L2. The v-phase switching elements Qv1 and Qv2 are connected in series to each other by a v-phase connection line. The v-phase connection line is branched and connected to the second end of the v-phase coil 24v. The collector of the v-phase switching device Qv1 is connected to the positive bus L1. The emitter of the v-phase switching element Qv2 is connected to the negative bus L2. The w-phase switching elements Qw1 and Qw2 are connected in series to each other by a w-phase connection line. The w-phase connection line is branched and connected to the second end of the w-phase coil 24w. The collector of the w-phase switching device Qw1 is connected to the positive bus L1. The emitter of the w-phase switching element Qw2 is connected to the negative bus L2.

Noise Reducer

The noise reducer 14 is located between the power storage device 120 and the inverter 13. The noise reducer 14 is located at the input side of the inverter 13. The noise reducer 14 reduces common mode noise included in the direct-current power supplied from the power storage device 120 to the inverter 13. Common mode noise reduced by the noise reducer 14 includes a common mode current Ic resulting from a neutral-point voltage Vn at the neutral point 24n of the electric motor 12. The common mode current Ic flows to the body of the vehicle 100 via a stray capacitance Cs, and then returns to the positive bus L1 and the negative bus L2 from the body.

The noise reducer 14 includes a choke coil 41. The choke coil 41 of the present embodiment is a common mode choke coil. The choke coil 41 includes a core 41a and a coil 41b wound around the core 41a. The choke coil 41 is arranged on the positive bus L1 and the negative bus L2. The noise reducer 14 also includes two capacitors 42. The capacitors 42 are Y-capacitors. The two capacitors 42 are connected in series. A connection line connecting the two capacitors 42 is branched and connected to the housing 16 so that the connection line is connected to ground through the body of the vehicle 100. The two capacitors 42 are connected in parallel to the choke coil 41. The two capacitors 42 are located between the choke coil 41 and the inverter 13. The noise reducer 14 is an LC filter formed by the choke coil 41 and the capacitors 42.

Figure 3:
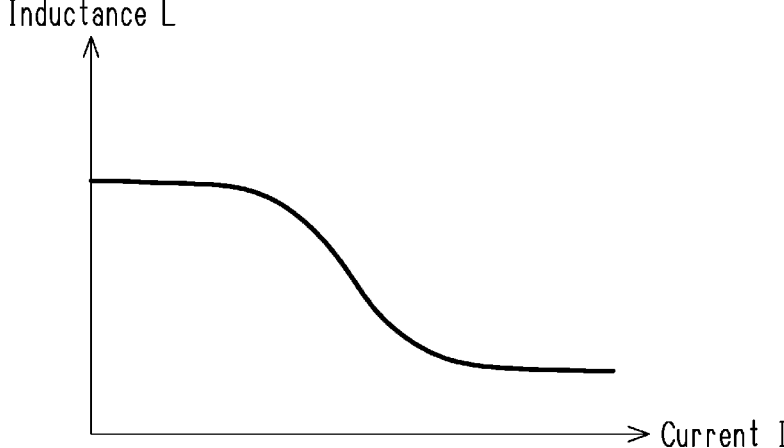
FIG. 3 is a diagram showing the relationship of the current flowing through the coil of a choke coil and the inductance of the choke coil.

FIG. 3 shows the relationship of current I, flowing through the coil 41b of the choke coil 41, and inductance L of the choke coil 41. When the current I flowing through the coil 41b of the choke coil 41 increases, the core 41a saturates magnetically and decreases the inductance L.

Figure 4:
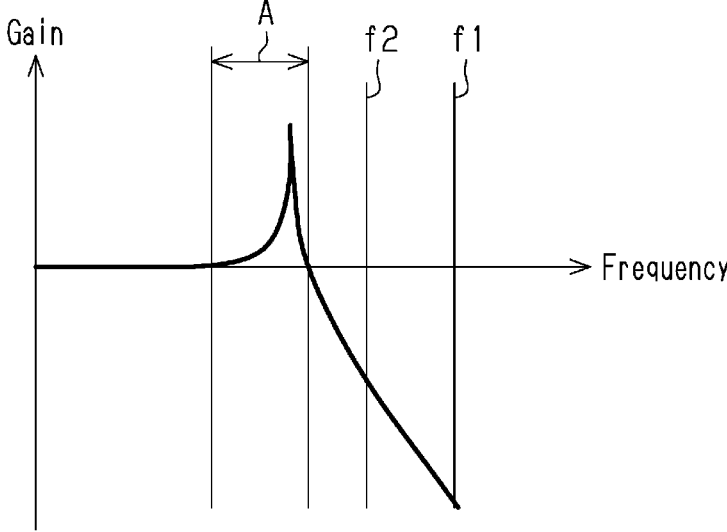
FIG. 4 is a diagram showing the relationship of a carrier frequency and a resonance frequency band.

As shown in FIG. 4, the noise reducer 14 has a resonance frequency band A. When the inductance L decreases as the current I flowing through the coil 41b of the choke coil 41 increases, the resonance frequency band A shifts to a higher frequency.

Inverter Controller

As shown in FIG. 2, the inverter controller 15 includes a voltage sensor 51, a current sensor 52, and a control unit 53.

The voltage sensor 51 detects direct voltage Vdc at the power storage device 120.

The current sensor 52 detects three-phase currents Iu, Iv, Iw. The three-phase currents Iu, Iv, Iw are a u-phase current Iu, a v-phase current Iv, and a w-phase current Iw. The u-phase current Iu flows through the u-phase coil 24u. The v-phase current Iv flows through the v-phase coil 24v. The w-phase current Iw flows through the w-phase coil 24w.

The control unit 53 is implemented by, for example, a hardware processor such as a central processing unit (CPU) executing a program (software). Some or all of these elements may be implemented by hardware such as a large scale integration (LSI) circuit, an application-specific integrated circuit (ASIC), a field-programmable gate array (FPGA), or a graphics processing unit (GPU), or may be implemented using software with hardware. That is, the control unit 53 may be processing circuitry. The program may be stored in advance in a storage device (not shown) including a non-transitory storage medium such as a hard disk drive (HDD) or a flash memory included in the inverter controller 15. The storage device may be implemented by, for example, the above-described various storage media, an electrically erasable programmable read-only memory (EEPROM), a read-only memory (ROM), a random access memory (RAM), or the like.

The control unit 53 drives the electric motor 12 by controlling the inverter 13, specifically, the switching elements Qu1 to Qw2. The control unit 53 includes a three-phase/two-phase conversion portion 53a, a position estimation portion 53b, a three-phase voltage instruction value determination portion 53c, a calculation portion 53d, a setting portion 53e, a generation portion 53f, and a rotation control portion 53g. The control unit 53 is connected to the air-conditioning ECU 113.

The three-phase/two-phase conversion portion 53a converts the three-phase currents Iu, Iv, Iw, detected by the current sensor 52, into two-phase currents Id, Iq. The two-phase currents Id, Iq are a d-axis current Id and a q-axis current Iq. The d-axis current Id and the q-axis current Iq are orthogonal to each other. The d-axis current Id is a current of a component in the axial direction of the magnetic flux of the rotor 22, that is, an excitation component current. The q-axis current Iq is a torque component current that contributes to the torque of the electric motor 12.

The position estimation portion 53b estimates the rotational position and the rotational speed of the rotor 22. The position estimation portion 53b estimates the rotational position of the rotor 22 and an actual rotational speed Nr from at least one of, for example, the two-phase currents Id, Iq and two-phase voltage instruction values Vdr, Vqr, which will be described later. The unit of the actual rotational speed Nr is, for example, rpm.

The three-phase voltage instruction value determination portion 53c obtains an external instruction value from the air-conditioning ECU 113. The external instruction value is, for example, an instructed rotational speed Nc. The unit of the instructed rotational speed Nc is, for example, rpm. The air-conditioning ECU 113 calculates a required flow rate of the refrigerant from the operation state of the air conditioner 110 or the like. The air-conditioning ECU 113 calculates the instructed rotational speed Nc that achieves the required flow rate of the refrigerant.

The three-phase voltage instruction value determination portion 53c determines three-phase voltage instruction values Vur, Vvr, Vwr from the instructed rotational speed Nc, obtained from the air-conditioning ECU 113, and the actual rotational speed Nr, estimated by the position estimation portion 53b. The three-phase voltage instruction values Vur, Vvr, Vwr are a u-phase voltage instruction value Vur, a v-phase voltage instruction value Vvr, and a w-phase voltage instruction value Vwr. The u-phase voltage instruction value Vur is a target value for the voltage applied to the u-phase coil 24u. The v-phase voltage instruction value Vvr is a target value for the voltage applied to the v-phase coil 24v. The w-phase voltage instruction value Vwr is a target value for the voltage applied to the w-phase coil 24w.

Specifically, the three-phase voltage instruction value determination portion 53c determines two-phase current instruction values Idr, Iqr from the instructed rotational speed Nc, obtained from the air-conditioning ECU 113, and the actual rotational speed Nr, estimated by the position estimation portion 53b. The two-phase current instruction values Idr, Iqr are a d-axis current instruction value Idr and a q-axis current instruction value Iqr. The d-axis current instruction value Idr is a target value for the d-axis current Id. The q-axis current instruction value Iqr is a target value for the q-axis current Iq.

The three-phase voltage instruction value determination portion 53c determines two-phase voltage instruction values Vdr, Vqr from the determined two-phase current instruction values Idr, Iqr and the two-phase currents Id, Iq converted by the three-phase/two-phase conversion portion 53a. The two-phase voltage instruction values Vdr, Vqr are a d-axis voltage instruction value Vdr and a q-axis voltage instruction value Vqr. The d-axis voltage instruction value Vdr is a target value for the voltage applied to the d-axis of the electric motor 12. The q-axis voltage instruction value Vqr is a target value for the voltage applied to the q-axis of the electric motor 12.

The three-phase voltage instruction value determination portion 53c determines three-phase voltage instruction values Vur, Vvr, Vwr from the two-phase voltage instruction values Vdr, Vqr. The three-phase voltage instruction values Vur, Vvr, Vwr are varied in accordance with an electrical angle. The three-phase voltage instruction values Vur, Vvr, Vwr each have, for example, a waveform with a reference amplitude in which each cycle is an electrical angle of 0° to 360°. The phases of the three-phase voltage instruction values Vur, Vvr, Vwr differ from one another. The phases of the three-phase voltage instruction values Vur, Vvr, Vwr are shifted from one another by, for example, 120°. The three-phase voltage instruction values Vur, Vvr, Vwr may have any waveform, such as a sine wave, a triangular wave, a rectangular wave, or a waveform deformed from one of these waveforms.

The calculation portion 53*d* calculates a modulation factor M from the direct voltage Vdc, detected by the voltage sensor 51, and the two-phase voltage instruction values Vdr, Vqr, determined by the three-phase voltage instruction value determination portion 53*c*. The modulation factor M is a ratio of a motor voltage Vm to the direct voltage Vdc. The motor voltage Vm is expressed as $\sqrt{(Vdr^2+Vqr^2)}$. Thus, the modulation factor M is expressed as $M=(\sqrt{(Vdr^2+Vqr^2)})/Vdc$. The modulation factor M is low when the electric motor 12 is activated or rotated at low rotational speed, and the modulation factor M is high when the electric motor 12 is rotated at high rotational speed. In this case, the modulation factor M is also affected by changes in the direct voltage Vdc.

The setting portion 53*e* sets a carrier frequency f for a carrier signal Pc in accordance with the modulation factor M calculated by the calculation portion 53*d*. When the modulation factor M is less than a predetermined modulation factor Mth, the setting portion 53*e* sets the carrier frequency f to a first frequency f1. When the modulation factor M is greater than or equal to the predetermined modulation factor Mth, the setting portion 53*e* sets the carrier frequency f to a second frequency f2 that is less than the first frequency f1. That is, the setting portion 53*e* sets a higher carrier frequency f when the modulation factor M is less than the predetermined modulation factor Mth than when the modulation factor M is greater than or equal to the predetermined modulation factor Mth.

For example, when the common mode current Ic is greater than a predetermined current value Icth, the core 41*a* of the choke coil 41 saturates magnetically and decreases the inductance L. In the present embodiment, the predetermined modulation factor Mth and the carrier frequency f are set so that the common mode current Ic is less than or equal to the predetermined current value Icth.

The common mode current Ic decreases as the modulation factor M increases. The modulation factor M when the carrier frequency f is the second frequency f2 and the common-mode current Ic is greater than the predetermined current value Icth is referred to as a modulation factor M0. In the case in which the carrier frequency f is the second frequency f2, when the modulation factor M is less than or equal to the modulation factor M0, the common mode current Ic is greater than the predetermined current value Icth. When the modulation factor M is greater than the modulation factor M0, the common mode current Ic is less than or equal to the predetermined current value Icth. In this case, the predetermined modulation factor Mth is set to be less than or equal to the modulation factor M0.

The common mode current Ic decreases as the carrier frequency f increases. The first frequency f1 is set so that the common mode current Ic is less than or equal to the predetermined current value Icth even when the modulation factor M is less than the predetermined modulation factor Mth.

As shown in FIG. 4, in the present embodiment, the setting portion 53*e* sets the first frequency f1 to a frequency higher than the resonance frequency band A of the noise reducer 14. In other words, when the modulation factor M is less than the predetermined modulation factor Mth, the setting portion 53*e* sets the carrier frequency f to a frequency higher than the resonance frequency band A of the noise reducer 14. In addition, the setting portion 53*e* also sets the second frequency f2 to a frequency higher than the resonance frequency band A of the noise reducer 14. In other words, when the modulation factor M is greater than or equal to the predetermined modulation factor Mth, the setting portion 53*e* sets the carrier frequency f to a frequency higher than the resonance frequency band A of the noise reducer 14.

The generation portion 53*f* generates PWM signals Pu, Pv, Pw from the three-phase voltage instruction values Vur, Vvr, Vwr, determined by the three-phase voltage instruction value determination portion 53*c*, and the carrier signal Pc having a carrier frequency f set by the setting portion 53*e*. The PWM signals Pu, Pv, Pw are a u-phase PWM signal Pu, a v-phase PWM signal Pv, and a w-phase PWM signal Pw. The u-phase PWM signal Pu is the voltage applied to the u-phase coil 24*u*. The v-phase PWM signal Pv is the voltage applied to the v-phase coil 24*v*. The w-phase PWM signal Pw is the voltage applied to the w-phase coil 24*w*. The PWM signals Pu, Pv, Pw set switching patterns of the switching elements Qu1 to Qw2, that is, each duty ratio.

Specifically, the generation portion 53*f* generates the u-phase PWM signal Pu from the u-phase voltage instruction value Vur, determined by the three-phase voltage instruction value determination portion 53*c*, and the carrier signal Pc having the carrier frequency f set by the setting portion 53*e*. The generation portion 53*f* generates the v-phase PWM signal Pv from the v-phase voltage instruction value Vvr, determined by the three-phase voltage instruction value determination portion 53*c*, and the carrier signal Pc having the carrier frequency f set by the setting portion 53*e*. The generation portion 53*f* generates the w-phase PWM signal Pw from the w-phase voltage instruction value Vwr, determined by the three-phase voltage instruction value determination portion 53*c*, and the carrier signal Pc having the carrier frequency f set by the setting portion 53*e*.

The rotation control portion 53*g* executes switching control on the switching elements Qu1 to Qw2 by sending the PWM signals Pu, Pv, Pw, generated by the generation portion 53*f*, to the switching elements Qu1 to Qw2. That is, the control unit 53 controls the switching elements Qu1 to Qw2 using the PWM signals Pu, Pv, Pw, which are generated from the three-phase voltage instruction values Vur, Vvr, Vwr and the carrier frequency f.

Operation Procedures

An example of the operation of the control unit 53 will now be described.

Figure 5:
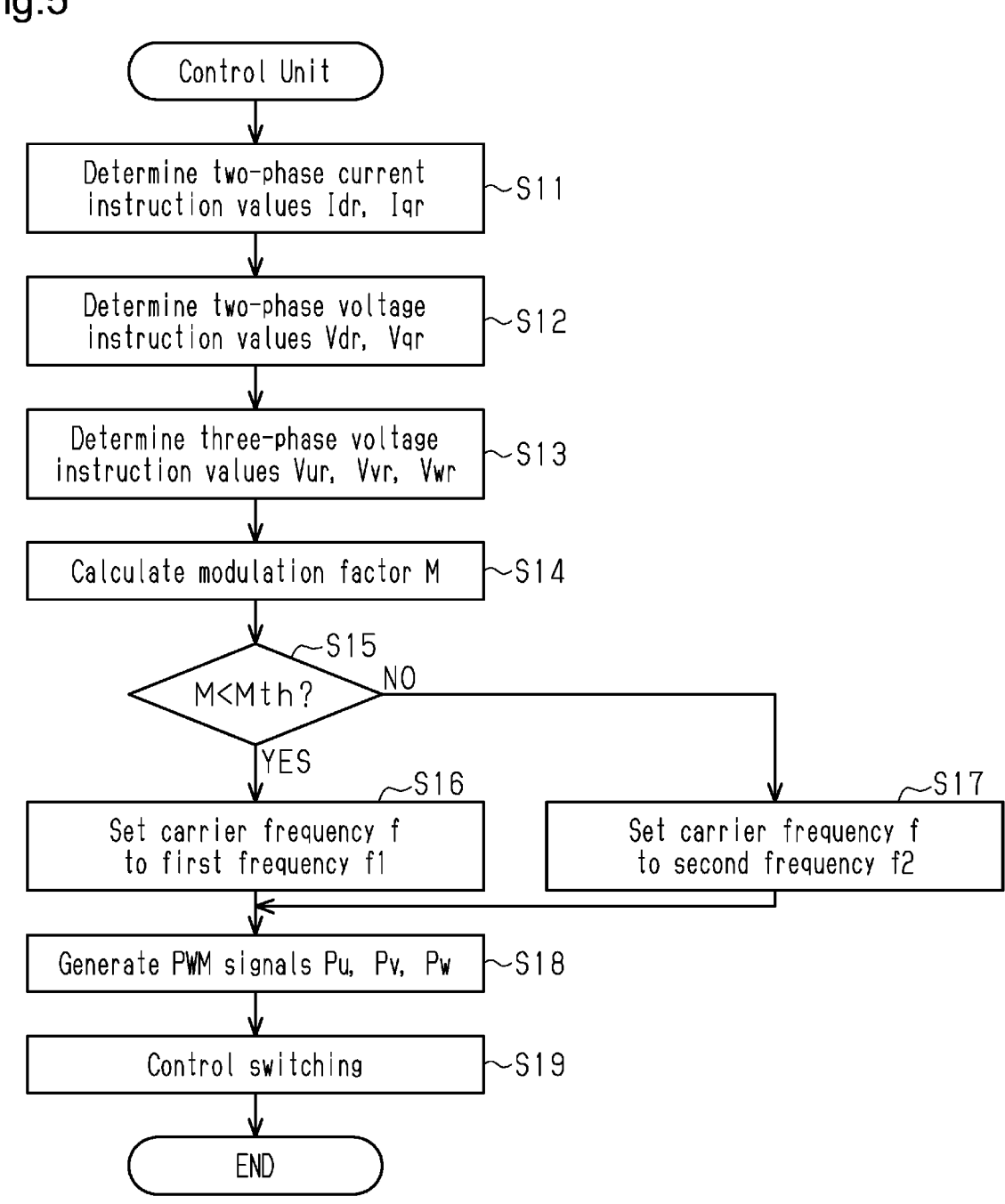
FIG. 5 is a flowchart showing an operation of a control unit in the embodiment.

As shown in FIG. 5, in step S11, the three-phase voltage instruction value determination portion 53*c* determines the two-phase current instruction values Idr, Iqr from the instructed rotational speed Nc, obtained from the air-conditioning ECU 113, and the actual rotational speed Nr, estimated by the position estimation portion 53*b*.

In step S12, the three-phase voltage instruction value determination portion 53*c* determines the two-phase voltage instruction values Vdr, Vqr from the determined two-phase current instruction values Idr, Iqr and the two-phase currents Id, Iq converted by the three-phase/two-phase conversion portion 53*a*.

In step S13, the three-phase voltage instruction value determination portion 53*c* determines the three-phase voltage instruction values Vur, Vvr, Vwr from the two-phase voltage instruction values Vdr, Vqr.

In step S14, the calculation portion 53*d* calculates the modulation factor M from the two-phase voltage instruction values Vdr, Vqr, determined by the three-phase voltage instruction value determination portion 53*c*, and the direct voltage Vdc, detected by the voltage sensor 51.

When the modulation factor M is less than the predetermined modulation factor Mth (YES in step S15), the process proceeds to step S16. In step S16, the setting portion 53*e* sets the carrier frequency f to the first frequency f1. When the modulation factor M is greater than or equal to the predetermined modulation factor Mth (NO in step S15), the process proceeds to step S17. In step S17, the setting portion 53e sets the carrier frequency f to the second frequency f2.

In step S18, the generation portion 53f generates the PWM signals Pu, Pv, Pw from the three-phase voltage instruction values Vur, Vvr, Vwr, determined by the three-phase voltage instruction value determination portion 53c, and the carrier signal Pc having the carrier frequency f set by the setting portion 53e.

In step 519, the rotation control portion 53g controls the switching elements Qu1 to Qw2 using the PWM signals Pu, Pv, Pw generated by the generation portion 53f.

Operation of Present Embodiment

The operation of the present embodiment will now be described using a comparative example.

In the present embodiment, the setting portion 53e sets the carrier frequency f in accordance with the modulation factor M calculated by the calculation portion 53d. When the modulation factor M is less than the predetermined modulation factor Mth, the setting portion 53e sets the carrier frequency f to the first frequency f1. When the modulation factor M is greater than or equal to a predetermined modulation factor Mth, the setting portion 53e sets the carrier frequency f to the second frequency f2. In the comparative example, the carrier frequency f is set to a fixed value regardless of the modulation factor M. The carrier frequency f is set to the second frequency f2.

Figures 6A, 6B, 6C:
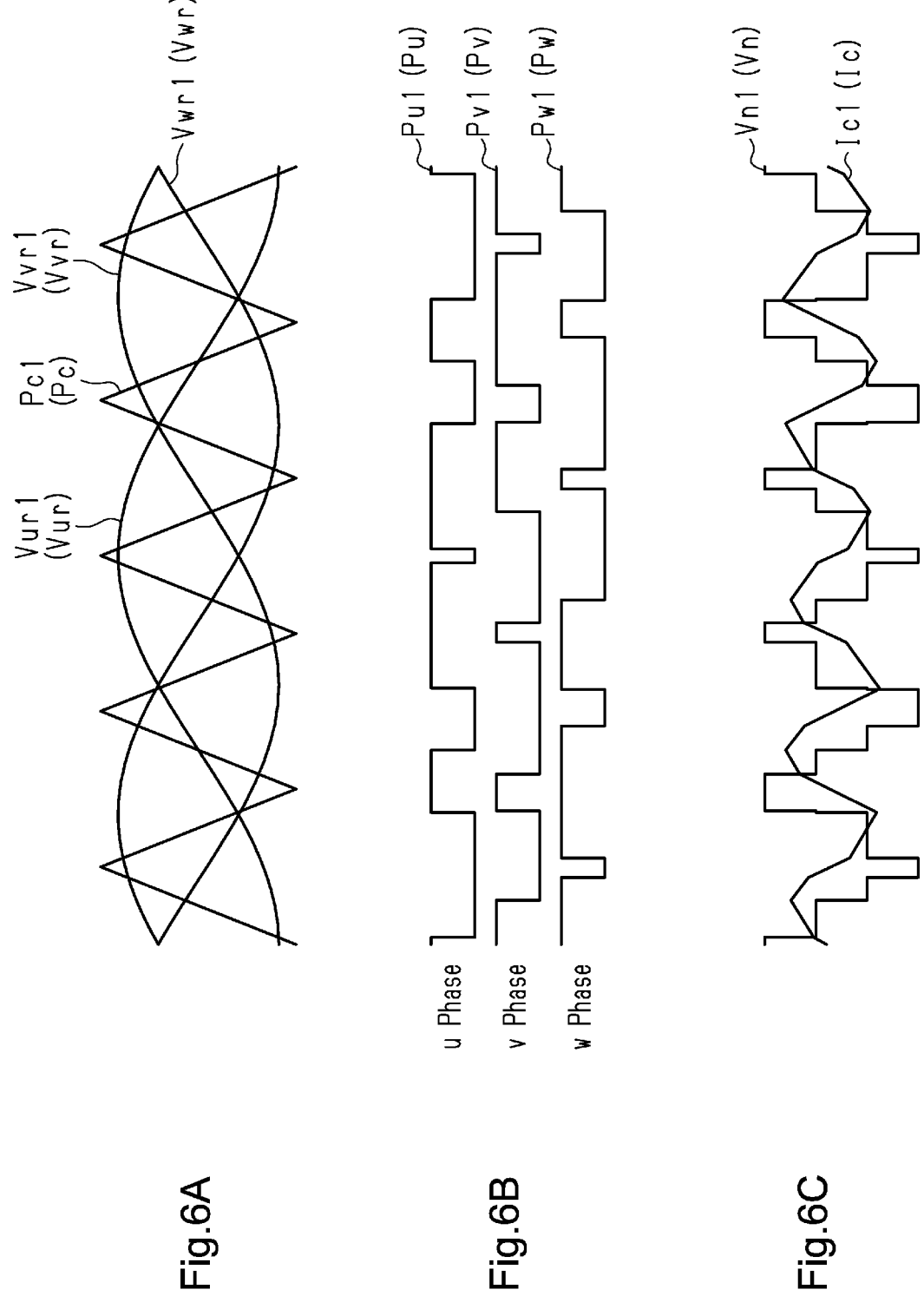
FIG. 6A is a diagram showing three-phase voltage instruction values and a carrier signal.
FIG. 6B is a diagram showing pulse width modulation (PWM) signals of three phases.
FIG. 6C is a diagram showing a neutral-point voltage and a common-mode current.

First, the embodiment and the comparative example when the modulation factor M is greater than or equal to the predetermined modulation factor Mth will be described with reference to FIGS. 6A, 6B, and 6C. FIGS. 6A, 6B, and 6C illustrate both of the embodiment and the comparative example.

FIG. 6A shows three-phase voltage instruction values Vur1, Vvr1, Vwr1 and a carrier signal Pc1 having the carrier frequency f that is the second frequency f2. FIG. 6B shows PWM signals Pu1, Pv1 Pw1. The PWM signals Pu1, Pv1, Pw1 are generated from the three-phase voltage instruction values Vur1, Vvr1, Vwr1 and the carrier signal Pc1. FIG. 6C shows a neutral-point voltage Vn1 and the common mode current Ic1. The neutral-point voltage Vn is obtained by dividing the sum of the u-phase PWM signal Pu, the v-phase PWM signal Pv, and the w-phase PWM signal Pw by 3. Thus, the neutral-point voltage Vn is expressed as (Pu+Pv+Pw)/3. The neutral-point voltage Vn1 is expressed as (Pu1+Pv1+Pw1)/3.

When the modulation factor M is greater than or equal to the predetermined modulation factor Mth and the carrier frequency f is the second frequency f2, the PWM signals Pu1, Pv1, Pw1 will have varying pulse widths. Further, the pulses of the PWM signals Pu1, Pv1, Pw1 will have edges that rise at different times and edges that fall at different times. Thus, the neutral-point voltage Vn1 has a trapezoidal waveform. In this case, the common mode current Ic1 is less than or equal to the predetermined current value Icth.

Next, in the comparative example, a case in which the modulation factor M is less than the predetermined modulation factor Mth will be described with reference to FIGS. 7A, 7B, and 7C.

Figures 7A, 7B, 7C:
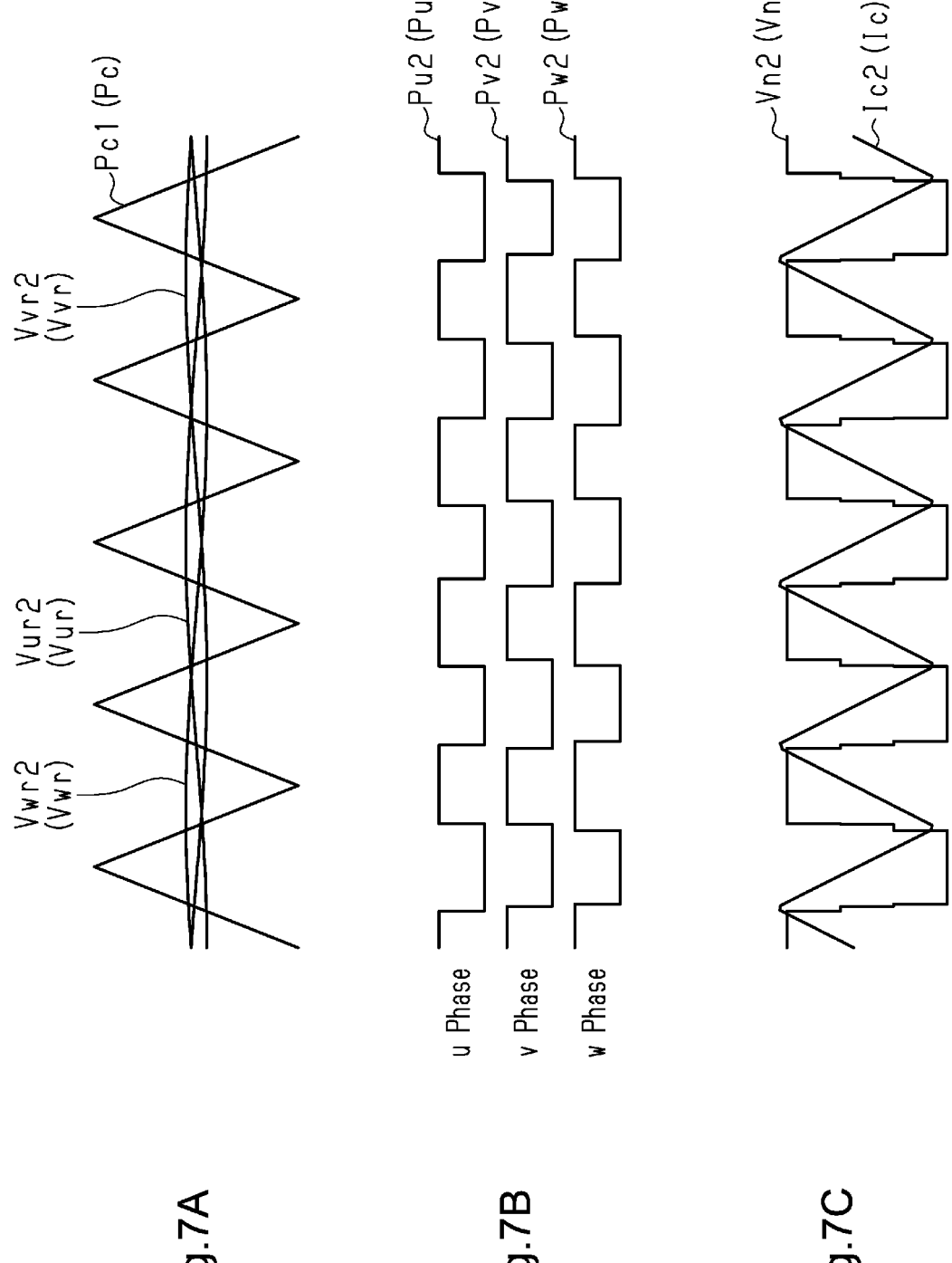
FIG. 7A is a diagram showing three-phase voltage instruction values and a carrier signal.
FIG. 7B is a diagram showing PWM signals of three phases.
FIG. 7C is a diagram showing a neutral-point voltage and a common-mode current.

FIG. 7A shows three-phase voltage instruction values Vur2, Vvr2, Vwr2 and the carrier signal Pc1 in the comparative example. The amplitudes of the three-phase voltage instruction values Vur2, Vvr2, Vwr2 are less than the amplitudes of the three-phase voltage instruction values Vur1, Vvr1, Vwr1. The carrier frequency f of the carrier signal Pc1 in the comparative example is the second frequency f2. FIG. 7B shows PWM signals Pu2, Pv2, Pw2 in the comparative example. The PWM signals Pu2, Pv2, Pw2 are generated from the three-phase voltage instruction values Vur2, Vvr2, Vwr2 and the carrier signal Pc1. FIG. 7C shows a neutral-point voltage Vn2 and a common mode current Ic2 in the comparative example. The neutral-point voltage Vn2 is expressed as (Pu2+Pv2+Pw2)/3.

When the modulation factor M is less than the predetermined modulation factor Mth and the carrier frequency f is the second frequency f2, the PWM signals Pu2, Pv2, Pw2 have substantially constant pulse widths. Further, the pulses of the PWM signals Pu2, Pv2, Pw2 will have edges that rise at substantially the same time and edges that fall at substantially the same time. Thus, the neutral-point voltage Vn2 has a square waveform. In the case in which the carrier frequency f is the second frequency f2, the amplitude of the common mode current Ic2 when the modulation factor M is less than the predetermined modulation factor Mth is greater than the amplitude of the common mode current Ic1 when the modulation factor M is greater than or equal to the predetermined modulation factor Mth. That is, if the carrier frequency f is a fixed value, the common mode current Ic increases when the modulation factor M decreases.

When the common mode current Ic is greater than the predetermined current value Icth, the core 41a of the choke coil 41 saturates magnetically and decreases the inductance L of the choke coil 41. When the inductance L of the choke coil 41 decreases, the resonance frequency band A of the noise reducer 14 shifts to a higher frequency. Thus, when the carrier frequency f is in the resonance frequency band A of the noise reducer 14, noise will be generated due to resonance.

Next, the embodiment when the modulation factor M is less than the predetermined modulation factor Mth will be described with reference to FIGS. 8A, 8B, and 8C.

Figures 8A, 8B, 8C:
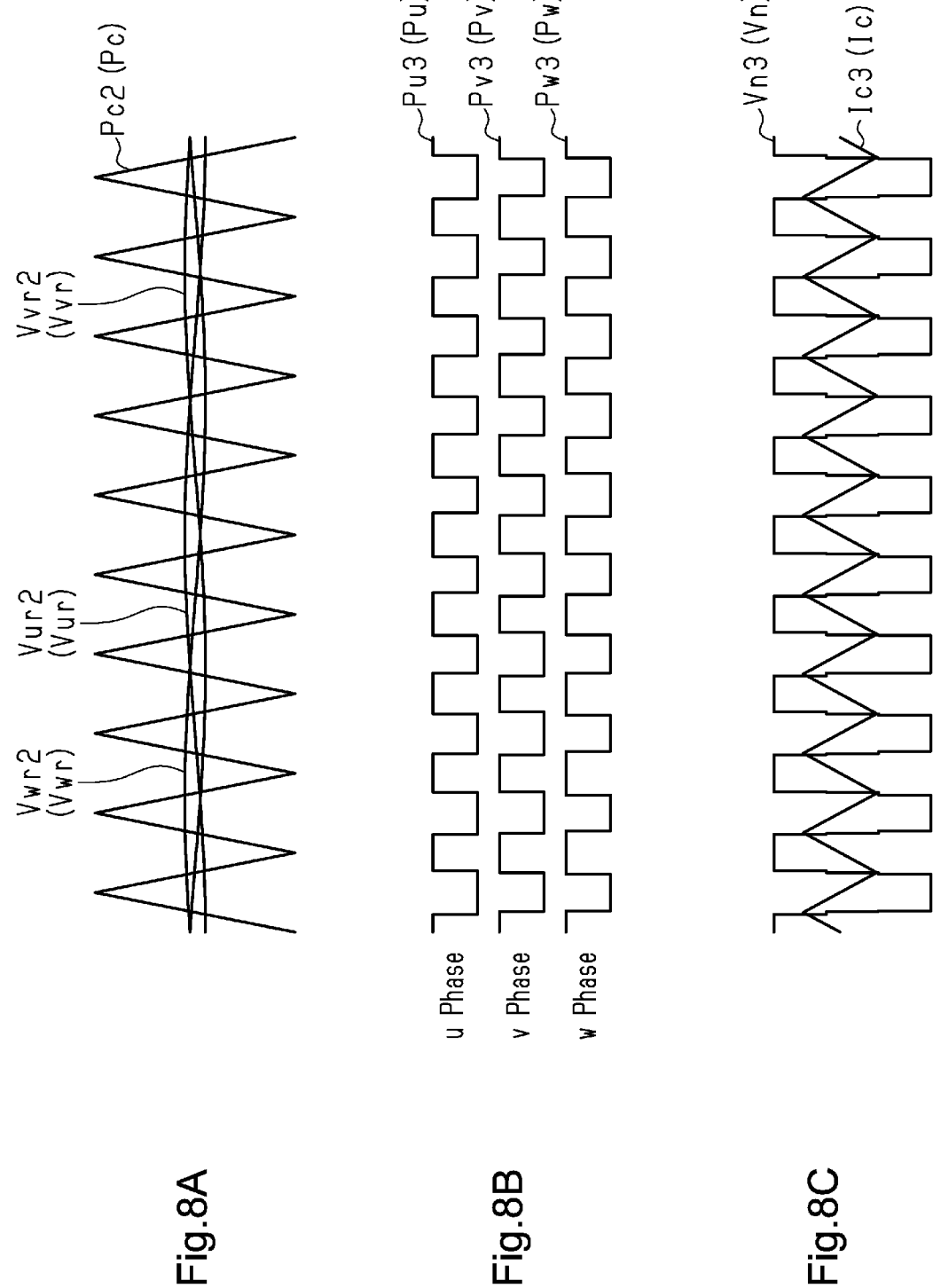
FIG. 8A is a diagram showing three-phase voltage instruction values and a carrier signal.
FIG. 8B is a diagram showing PWM signals of three phases.
FIG. 8C is a diagram showing a neutral-point voltage and a common-mode current.

FIG. 8A shows the three-phase voltage instruction values Vur2, Vvr2, Vwr2 and a carrier signal Pc2 in the embodiment. The carrier frequency f of the carrier signal Pc2 in the embodiment is the first frequency f1 that is higher than the second frequency f2. FIG. 8B shows PWM signals Pu3, Pv3 Pw3 in the embodiment. The PWM signals Pu3, Pv3, Pw3 are generated from the three-phase voltage instruction values Vur2, Vvr2, Vwr2 and the carrier signal Pc2. FIG. 8C shows a neutral-point voltage Vn3 and a common mode current Ic3 in the embodiment. The neutral-point voltage Vn3 is expressed as (Pu3+Pv3+Pw3)/3.

When the modulation factor M is less than the predetermined modulation factor Mth and the carrier frequency f is the first frequency f1, the PWM signals Pu3, Pv3, Pw3 have substantially constant pulse widths. Further, the pulses of the PWM signals Pu3, Pv3, Pw3 will have edges that rise at substantially the same time and edges that fall at substantially the same time. Thus, the neutral-point voltage Vn3 has a square waveform in the same manner as in the comparative example. In contrast, the carrier frequency f of the carrier signal Pc2 in the embodiment is higher than the carrier frequency f of the carrier signal Pc1 in the comparative example. In other words, the cycle of the carrier signal Pc2 in the embodiment is shorter than the cycle of the carrier signal Pc1 in the comparative example. Thus, the pulse widths of the PWM signals Pu3, Pv3, Pw3 in the embodiment are less than the pulse widths of the PWM signals Put, Pv2, Pw2 in the comparative example. Accordingly, the pulse width of the neutral-point voltage Vn3 in the embodiment is less than the pulse width of the neutral-point voltage Vn2 in the comparative example. As a result, the amplitude of the common mode current Ic3 in the embodiment is less than the amplitude of the common mode current Ic2 in the comparative example. That is, the common mode current Ic in the embodiment is reduced in comparison with the comparative example. The common mode current Ic3 in the embodiment is less than or equal to the predetermined current value Icth.

In this manner, when the modulation factor M is less than the predetermined modulation factor Mth, the carrier frequency f is set to the first frequency f1 that is higher than the second frequency f2 so that the common-mode current Ic is reduced. In this case, the core 41a of the choke coil 41 will not saturate magnetically and will not decrease the inductance L. Thus, the resonance frequency band A of the noise reducer 14 will not shift to a higher frequency. In the present embodiment, the first frequency f1 and the second frequency f2 serving as the carrier frequency f are set to frequencies higher than the resonance frequency band A. This reduces noise caused by resonance when the carrier frequency f is in the resonance frequency band A.

Advantages of Present Embodiment

The present embodiment has the following advantages.

(1) The setting portion 53e sets a higher carrier frequency when the modulation factor M is less than the predetermined modulation factor Mth than when the modulation factor M is greater than or equal to the predetermined modulation factor Mth. Thus, the pulse width of the neutral point voltage Vn will be shorter and the amplitude of the common mode current Ic will be smaller than when the same carrier frequency f is used regardless of whether the modulation factor M is less than the predetermined modulation factor Mth or the modulation factor M is greater than or equal to the predetermined modulation factor Mth. This reduces the common mode current Ic.

The common mode current Ic is smaller when the modulation factor M is greater than or equal to the predetermined modulation factor Mth than when the modulation factor M is less than the predetermined modulation factor Mth. Thus, the carrier frequency f is set to be lower when the modulation factor M is greater than or equal to the predetermined modulation factor Mth, than when the modulation factor M is less than the predetermined modulation factor Mth to reduce the number of times switching operations are performed with the switching elements Qu1 to Qw2. This reduces switching loss. Failure in components caused by heating of the switching elements Qu1 to Qw2 is also reduced.

(2) The noise reducer 14 includes the choke coil 41 and the capacitors 42. When the modulation factor M is less than the predetermined modulation factor Mth, the setting portion 53e sets the carrier frequency f to a frequency higher than the resonance frequency band A of the noise reducer 14. Thus, the second frequency f2, which is the carrier frequency f when the modulation factor M is less than the predetermined modulation factor Mth, is not included in the resonance band A of the noise reducer 14. This reduces noise generated due to resonance.

(3) The reduced common mode current Ic will limit magnetic saturation of the core 41a of the choke coil 41 so that the inductance L of the choke coil 41 will not decrease. Thus, the resonance frequency band A will not shift to a higher frequency. This will reduce noise generated due to resonance caused when the carrier frequency f is in the resonance frequency band A.

(4) The common mode current Ic is reduced without changing the structure of components, for example, by changing the material of the core 41a or increasing the number of windings of the coil 41b.

Modifications

The above-described embodiment may be modified as follows. The above-described embodiment and the following modifications can be combined as long as the combined modifications remain technically consistent with each other.

The switching elements Qu1 to Qw2 do not need to be IGBTs. The switching elements Qu1 to Qw2 may be, for example, metal oxide semiconductor field-effect transistors (MOSFETs).

The configuration of the noise reducer 14 may be changed as long as common mode noise can be reduced.

The choke coil 41 may be structured to reduce normal mode noise with leakage flux of the core 41a in addition to reducing common mode noise.

The current sensor 52 does not need to detect all of the three-phase currents Iu, Iv, Iw. The current sensor 52 may detect two currents of the three-phase currents Iu, Iv, Iw, and the remaining one current may be obtained through calculation.

When the modulation factor M is associated with time information, the setting portion 53e may set the carrier frequency f from the time information.

For example, the modulation factor M may be less than the predetermined modulation factor Mth from when the air-conditioning ECU 113 transmits an instruction to activate the electric motor 12 to the inverter controller 15 at time t0 until predetermined time t1. Further, the modulation factor M may greater than or equal to the predetermined time Mth at predetermined time t1. In this case, the setting portion 53e sets the carrier frequency f to the first frequency f1 from time t0 until time t1. The setting portion 53e changes the carrier frequency f from the first frequency f1 to the second frequency f2 at time t1. In other words, the setting portion 53e sets the carrier frequency f without comparing the modulation factor M with the predetermined modulation factor Mth. In this case, when the modulation factor M is less than the predetermined modulation factor Mth, the setting portion 53e sets a higher carrier frequency f than when the modulation factor M is greater than or equal to the predetermined modulation factor Mth.

The electric motor device 10 does not need to be applied to the motor-driven compressor 111. Instead, the electric motor device 10 may be used as a drive motor that drives the vehicle 100.

The connection line connecting the two capacitors 42 does not need to be branched and connected to the housing 16. Instead, the connection line may be branched and connected to ground through the body of the vehicle 100.

The connection line connecting the two capacitors 42 does not need to be branched or connected to the housing 16.

The common mode current Ic may flow to the housing 16 via the stray capacitance Cs, and then return to the positive bus L1 and the negative bus L2 from the housing 16 via a stray capacitance between the housing 16 and the positive bus L1 and a stray capacitance between the housing 16 and the negative bus L2.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electric motor device, comprising:

an electric motor including coils for three-phases, the coils having first ends electrically connected to each other to form a neutral point;

an inverter including a switching element and configured to drive the electric motor;

a noise reducer located at an input side of the inverter, the noise reducer being located between a direct-current power supply and the inverter and including a capacitor and a choke coil, wherein the noise reducer is configured to reduce common mode noise;

processing circuitry configured to control the switching element using a pulse width modulation (PWM) signal generated from a voltage instruction value and a carrier frequency; and a metal housing accommodating the electric motor, the inverter, the noise reducer, and the processing circuitry and configured to be connected to ground through a body of a vehicle, a stray capacitance being between the neutral point and the body of the vehicle or between the neutral point and the metal housing, wherein the processing circuitry is configured to:

calculate a modulation factor of the voltage instruction value; and set the carrier frequency in accordance with the calculated modulation factor, and when the modulation factor is less than a predetermined modulation factor, the carrier frequency is a first frequency that is higher than a second frequency, when the modulation factor is greater than or equal to the predetermined modulation factor, the carrier frequency is the second frequency that is less than the first frequency, wherein the first frequency and the second frequency are set to frequencies higher than a resonance frequency band of the noise reducer, and wherein the first frequency is set so that a common mode current is less than or equal to a predetermined current value even when the modulation factor is less than the predetermined modulation factor.

\*   \*   \*   \*   \*